(12) United States Patent
Chang et al.

(10) Patent No.: US 8,054,402 B2
(45) Date of Patent: Nov. 8, 2011

(54) OPTICAL MEMBER, BACKLIGHT ASSEMBLY AND DISPLAY APPARATUS HAVING THE SAME

(75) Inventors: Moon-Hwan Chang, Cheonan-si (KR); Taek-Sun Shin, Cheonan-si (KR); Byung-Seo Yoon, Incheon (KR); Gi-Cherl Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 140 days.

(21) Appl. No.: 12/351,655

(22) Filed: Jan. 9, 2009

(65) Prior Publication Data
US 2009/0213576 A1  Aug. 27, 2009

(30) Foreign Application Priority Data
Feb. 22, 2008 (KR) .................... 10-2008-0016116

(51) Int. Cl.
*G02F 1/13357* (2006.01)
*G02F 1/01* (2006.01)

(52) U.S. Cl. .............. 349/61; 349/64; 349/65; 362/608; 362/97.2

(58) Field of Classification Search .................... 349/61, 349/65, 74, 77; 362/608, 612, 613, 621, 362/97.2, 97.3; 345/102, 107; 359/296
See application file for complete search history.

(56) References Cited

U.S. PATENT DOCUMENTS

| | | | | |
|---|---|---|---|---|
| 5,409,734 A * | 4/1995 | Lee et al. | ................... | 427/163.1 |
| 6,621,534 B2 * | 9/2003 | Lin et al. | ................... | 349/16 |
| 7,307,675 B2 * | 12/2007 | Abileah | ................... | 349/61 |
| 2004/0165060 A1 * | 8/2004 | McNelley et al. | ......... | 348/14.08 |
| 2005/0140848 A1 * | 6/2005 | Yoo et al. | ................... | 349/64 |

* cited by examiner

*Primary Examiner* — David Nelms
*Assistant Examiner* — Tai Duong
(74) *Attorney, Agent, or Firm* — Innovation Counsel LLP (57) ABSTRACT

An optical member according to one or more embodiments includes an optical plate and an optical film. In an embodiment, the optical plate includes an incident part receiving light provided from the exterior and an emitting part emitting the light. The optical film is attached to the incident part and includes a first conductive layer, a second conductive layer facing the first conductive layer and polarized particles disposed between the first conductive layer and the second conductive layer. Thus, light sources of a backlight assembly may be individually driven regardless of the type of light source and the disposition of the light sources, and image display quality may be improved by improving a contrast ratio by realizing various gradation voltages.

17 Claims, 9 Drawing Sheets

OPTICAL MEMBER, BACKLIGHT ASSEMBLY AND DISPLAY APPARATUS HAVING THE SAME

CROSS-REFERENCE TO RELATED APPLICATIONS

The present application claims priority under and benefit from Korean Patent Application No. 2008-16116, filed on Feb. 22, 2008 in the Korean Intellectual Property Office (KIPO), the contents of which are herein incorporated by reference in their entirety.

BACKGROUND

1. Technical Field

Embodiments of the present invention generally relate to an optical member, a backlight assembly and a display device having the optical member. More particularly, embodiments of the present invention relate to an optical member for displaying an image on a display panel, a backlight assembly and a display device having the optical member.

2. Description of the Related Art

Generally, a liquid crystal display (LCD) device displays an image using electrical and optical characteristics of liquid crystal. LCD devices have a thinner thickness, lighter weight, lower power consumption and lower driving voltage than other types of display devices, and thus, LCD devices are being widely used in various fields.

An LCD device includes an LCD panel displaying an image using the light transmissivity of liquid crystal and a backlight assembly disposed under the LCD panel to provide light to the LCD panel.

The LCD panel includes a first substrate having switching devices for driving each one of a plurality of pixel regions, a second substrate facing the first substrate and a liquid crystal layer interposed between the first substrate and the second substrate.

The backlight assembly includes a light source that generates light for displaying the image on the LCD panel. For example, the light source may be a cold cathode fluorescent lamp (CCFL), a hot cathode fluorescent lamp (HCFL) or a light-emitting diode (LED).

Recently, a local dimming system that divides the light source into a plurality of regions and controls each region has been developed. The local dimming system may be embodied by classifying the light source as either a line-shape light source or a block-shape light source.

A local dimming backlight assembly for driving the local dimming system includes a point light source such as a diode that is a definitive type of light source because the point light source is capable of respectively driving each region and emitting straight light. For example, when a linear light source such as a CCFL instead of a point light source is used for the local dimming system, a driving unit that is different from a driving unit of the local dimming backlight assembly that uses the point light source is required.

Thus, for the local dimming system, the type of light source is restricted and the driving unit corresponding to the type of light source is required. Also, a gradation voltage level capable of controlling a voltage applied to the light source is restricted.

SUMMARY

Embodiments of the present invention may obviate the above problems and thus, embodiments of the present invention provide an optical member capable of improving image display quality.

Embodiments of the present invention also provide a backlight assembly having the optical member. Embodiments of the present invention also provide a display device having the optical member.

In an aspect according to an embodiment of the present invention, an optical member includes an optical plate and an optical film. The optical plate includes an incident part receiving light from the exterior and an emitting part emitting the light. The optical film is attached to the incident part and includes a first conductive layer, a second conductive layer facing the first conductive layer, and polarized particles disposed between the first conductive layer and the second conductive layer.

The polarized particles may be arranged in substantially the same direction in response to an electric field generated between the first conductive layer and the second conductive layer.

The optical film may include a plurality of regions receiving different voltages and the plurality of regions may have different transmissivities.

The optical film may further include a first transparent film, a second transparent film and a matrix polymer. The first transparent film may be disposed between the incident part and the first conductive layer. The second transparent film may face the first transparent film and may be coupled with the second conductive layer. The matrix polymer may be disposed between the first conductive layer and the second conductive layer.

In another aspect according to another embodiment of the present invention, a backlight assembly includes a light source, an optical plate, an optical film and a dimming driving part.

The light source generates light. The optical plate includes an incident part receiving the light and an emitting part emitting the light. The optical film is attached to the incident part and includes a first conductive layer, a second conductive layer facing the first conductive layer, and polarized particles disposed between the first conductive layer and the second conductive layer. The dimming driving part applies a dimming signal to the first conductive layer and the second conductive layer.

The optical film may include a plurality of regions receiving different voltages and may have different transmissivities.

The light source may be disposed at a side portion of the optical plate. The optical film may be attached to a side surface of the optical plate, and may divide the emitting part of the optical plate into stripe regions that have different transmissivities according to the dimming signal. The light source may include a lamp or a light-emitting diode (LED).

The light source may be disposed under the optical plate. The optical film may be attached to a lower surface of the optical plate, and may divide the emitting part of the optical plate into matrix regions that have different transmissivities according to the dimming signal. The light source may include a lamp or an LED.

In still another aspect of an embodiment of the present invention, a display device includes a display panel, a control unit, a light source, an optical plate, an optical film and a first dimming driving part.

The display panel displays an image. The control unit controls a driving of the display panel. The light source generates light provided to the display panel. The optical plate includes an incident part receiving the light and an emitting part emitting the light to the display panel. The optical film is attached to the incident part and includes a first conductive layer, a second conductive layer facing the first conductive layer and polarized particles between the first conductive layer and the second conductive layer, and the optical film is electrically divided into a plurality of regions. The first dimming driving part applies a first dimming signal to the first conductive layer and the second conductive layer.

The first dimming driving part may output the first dimming signal according to the control of the control unit.

Each of the regions of the optical film may have a variable transmissivity according to a voltage level of the first dimming signal.

The light source may include a plurality of LEDs and the LEDs may be divided into a plurality of regions. The LEDs may be driven by a second dimming driving unit outputting a second dimming signal that may be synchronized with the first dimming signal and may control driving of each region.

According to one or more embodiments of the present invention as described above, productivity may be improved because an optical member, a backlight assembly and a display device are not restricted by a type of light source. Also, image display quality may be improved, because a contrast ratio may be improved by realizing various gradation voltages using a variable transmissivity film.

BRIEF DESCRIPTION OF THE DRAWINGS

The above and other features and advantage points of the embodiments of the present invention will become more apparent by describing in detail exemplary embodiments thereof with reference to the accompanying drawings, in which.

DETAILED DESCRIPTION

Embodiments of the invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the embodiments of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to nonimplanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
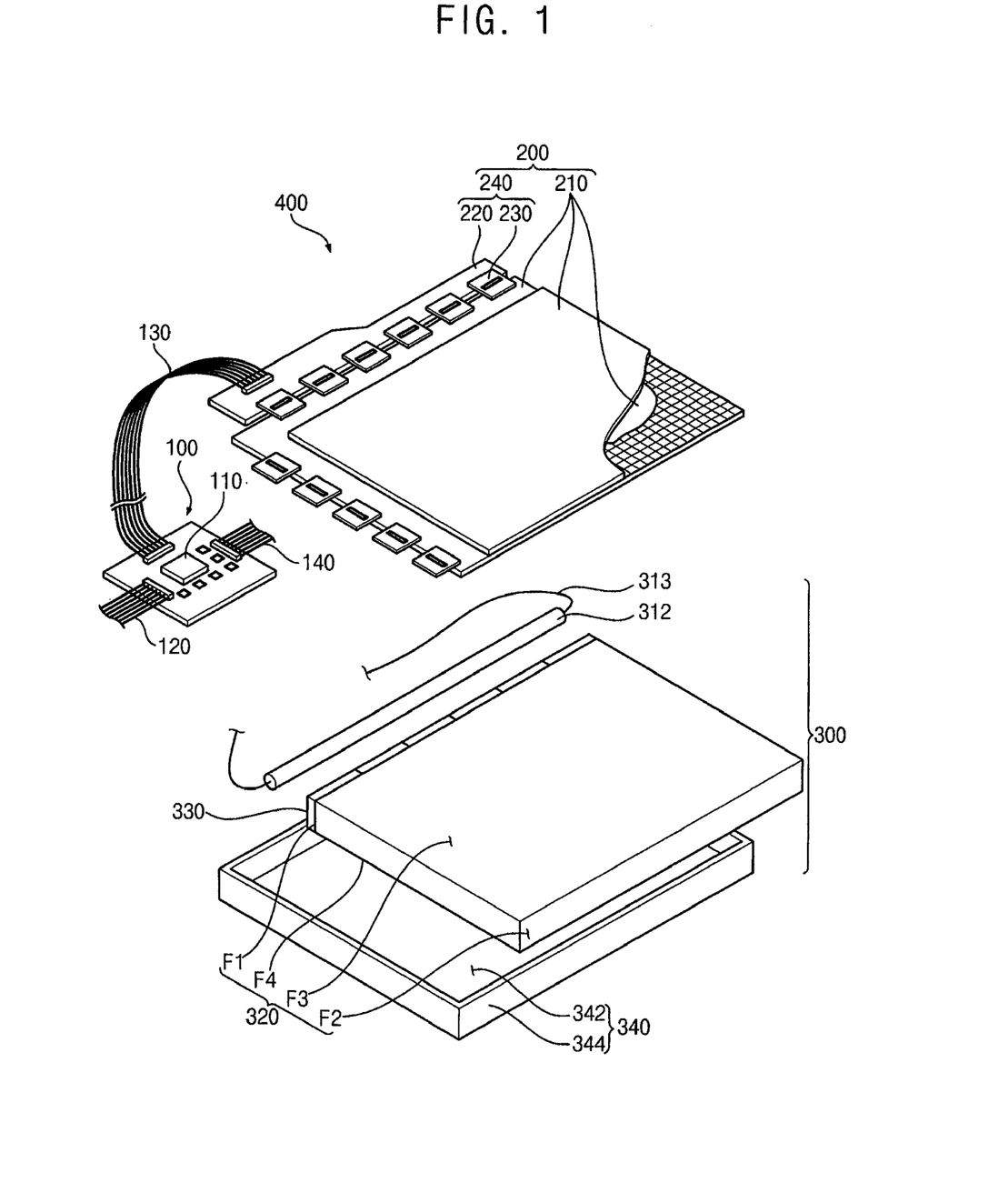
FIG. 1 is a perspective view illustrating a display device according to an embodiment of the present invention.
Figure 2:
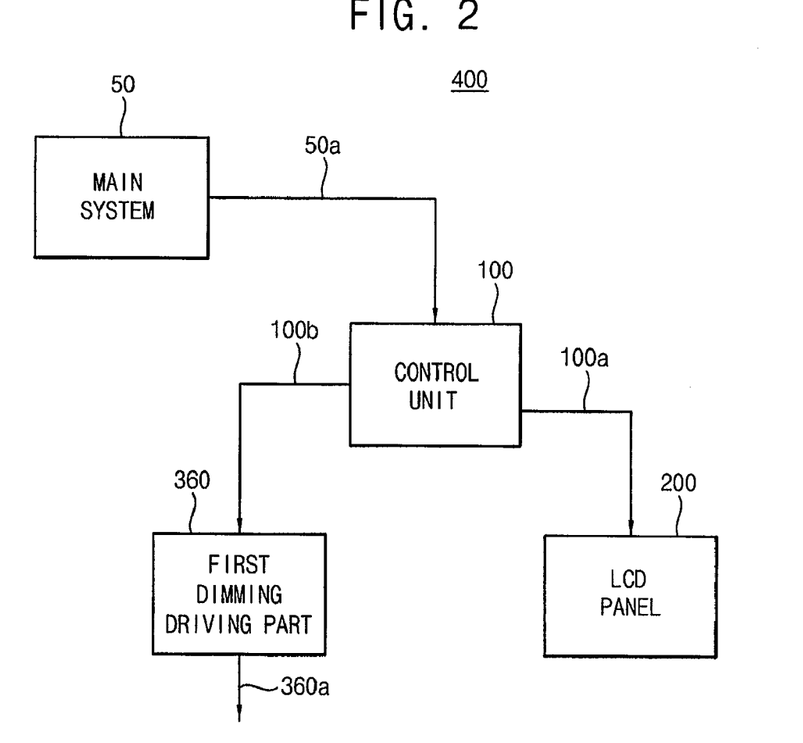
FIG. 2 is a block diagram illustrating the display device of FIG. 1.

FIG. 1 is a perspective view illustrating a display device according to an embodiment of the present invention. FIG. 2 is a block diagram illustrating the display device in FIG. 1.

Referring to FIGS. 1 and 2, a display device 400 according to the present embodiment includes a control unit 100, a display panel unit 200 and a backlight assembly 300. The control unit 100 includes a control part 110, a first connector 120, a second connector 130 and a third connector 140. The control unit 100 receives an external control signal 50a from a main system 50 and outputs an output signal including an image control signal 100a and a first dimming control signal 100b based on the external control signal 50a. The external control signal 50a includes an image signal and a time synchronization signal.

The first connector 120 electrically connects the main system 50 with the control part 110. The second connector 130 electrically connects the display panel unit 200 with the control part 110. The third connector 140 electrically connects the backlight assembly 300 with the control part 110. The third connector 140 is electrically connected with a first dimming driving part 360 of the backlight assembly 300.

The display panel unit 200 includes a display panel 210, a source driving part 240 and a gate driving part (not shown).

The display panel 210 includes a plurality of pixels and displays an image by driving the source driving part 240 and the gate driving part. The source driving part 240 includes a printed circuit board (PCB) 220 and a flexible printed circuit board (FPCB) 230.

The source driving part 240 and the gate driving part of the display panel unit 200 are controlled by the image control signal 100a. The PCB 220 is electrically connected to the control unit 100. The image control signal 100a is applied to the PCB 220 from the control unit 100. The FPCB 230 includes a source driving chip (not shown) and connects the PCB 220 with the source driving chip. The source driving chip may be included in the display panel 210.

The backlight assembly 300 includes a light source 312, a light-guide plate 320, a variable transmissivity film 330, a receiving member 340 and the first dimming driving part 360. The backlight assembly 300 is disposed under the display panel unit 200 and provides light to the display panel unit 200. The backlight assembly 300 according to the present embodiment is an edge illumination type backlight assembly in which the light source 312 is disposed at a side portion of the light-guide plate 320.

The light source 312 generates light provided to the display panel unit 200. The light source 312 according to the present embodiment is a linear light source. For example, the light source 312 may be a cold cathode fluorescent lamp (CCFL) or a hot cathode fluorescent lamp (HCFL), etc. Both ends of the light source 312 include electrodes 313 that provide power to the light source 312. The electrodes 313 may be electrically connected to a power supply part (not shown) and may provide the power to the light source 312.

The light-guide plate 320 is an optical plate that guides the light to be emitted from a front surface of the display panel 210. The light-guide plate 320 may include a first surface F1, a second surface F2, a third surface F3 and a fourth surface F4. The first surface F1 is an incident part and the third surface F3 is an emitting part.

The light generated from the light source 312 may be provided to the light-guide plate 320 through the first surface F1 because the first surface F1 faces the light source 312. The first surface F1 may be connected to the second surface F2 through the third surface F3 because the second surface F2 faces the first surface F1. The light passing through the first surface F1 is emitted through the third surface F3 and the light passing through the third surface F3 is provided to the display panel 210 because the third surface F3 is perpendicular to the first surface F1 and the second surface F2. The fourth surface F4 is parallel with the third surface F3 and is perpendicular to the first surface F1 and the second surface F2. The fourth surface F4 is parallel with a bottom portion 342 of the receiving member 340. For example, the fourth surface F4 may include dots or prisms that reflect the light passing through the first surface F1 from the fourth surface F4 to the third surface F3.

The variable transmissivity film 330 is disposed between the light source 312 and the first surface F1 of the light-guide plate 320. For example, the variable transmissivity film 330 may be attached to the first surface F1 of the light-guide plate 320. The variable transmissivity film 330 may be electrically divided into a plurality of regions. The variable transmissivity film 330 will be described later in detail with reference to separate drawings.

The receiving member 340 may receive the display panel unit 200, the light source 312, the light-guide plate 320, the variable transmissivity film 330, etc. For example, the receiving member 340 may include the bottom portion 342 and sidewall portions 344 extended from the bottom portion 342. The bottom portion 342 and sidewall portions 344 form a receiving space.

The backlight assembly 300 may further include optical sheets (not shown) that are disposed between the display panel 210 and the light-guide plate 320 to enhance optical characteristics. For example, the optical sheets may include a light diffusing sheet enhancing uniform distribution of luminance and at least one prism sheet increasing front luminance of the light.

The first dimming driving part 360 is electrically connected to the variable transmissivity film 330 and the control unit 100. The first dimming driving part 360 receives the first dimming control signal 100b from the control unit 100, the first dimming control signal 100b being generated based on the image control signal 100a. The first dimming driving part 360 provides a first dimming signal 360a to the variable transmissivity film 330 based on the first dimming control signal 100b. The first dimming signal 360a may be provided to each of the regions of the variable transmissivity film 330. In an embodiment, the first dimming control signal 100b may be provided to the first dimming driving part 360 by synchronizing with the image control signal 100a.

Figure 3:
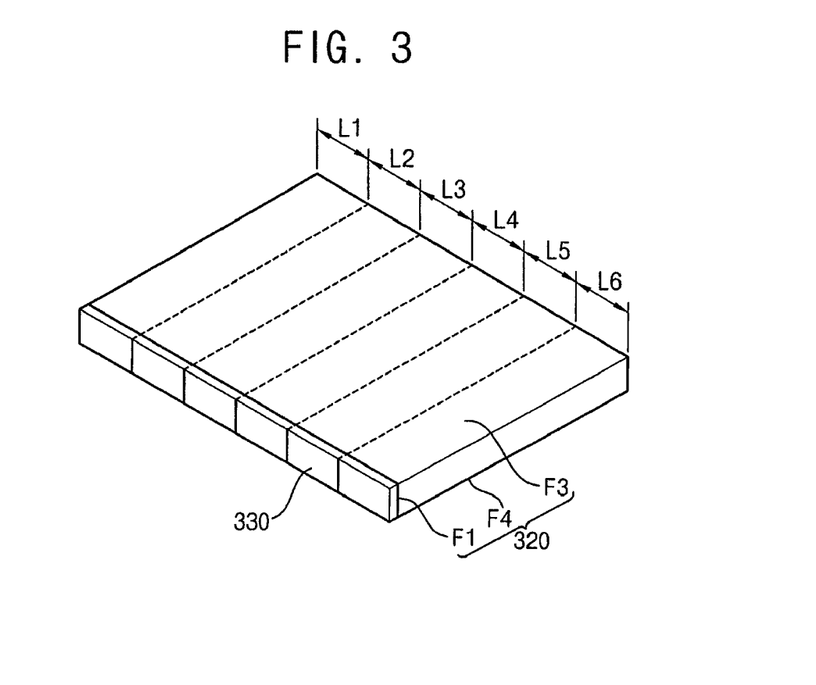
FIG. 3 is a conceptual view illustrating regions of the backlight assembly illustrated in FIG. 1 according to an embodiment.

FIG. 3 is a conceptual view illustrating regions of the backlight assembly illustrated in FIG. 1 according to an embodiment.

Referring to FIG. 3, the variable transmissivity film 330 is attached to the first surface F1 of the light-guide plate 320. The variable transmissivity film 330 may cover the entire first surface F1 of the light-guide plate 320. However, a plurality of variable transmissivity films 330 may be attached to the first surface F1.

The variable transmissivity film 330 may be electrically divided into a plurality of regions and the first dimming signal 360a is applied to each of the regions. Each of regions L1 to L6 of the fourth surface F4 of the light-guide plate 320 receive voltages that are different from each other based on the first dimming signal 360a. For example, each of the regions L1 to L6 may have a stripe shape. A luminance of the regions L1 to L6 corresponds to a luminance of the image displayed on the display panel 210.

The different first dimming signals corresponding to the luminance of the image are applied to the regions L1 to L6 of the variable transmissivity film 330, respectively, so that the backlight assembly 300 may have an effect substantially the same as by dividing the backlight assembly 300 into a plurality of regions.

In FIGS. 1, 2 and 3, the light source 312 disposed on a side portion of the light-guide plate 320 is described according to one or more embodiments. However, the light source 312 may be disposed on both portions of the light-guide plate 320, and the variable transmissivity film 330 may be attached to, for example, the second surface F2 when the second surface F2 as well as the first surface F1 receives the light. The variable transmissivity film 330 may also be attached to the third surface F3 of the light-guide plate 320.

Hereinafter, a principle for controlling the transmissivity of the variable transmissivity film 330 will be described with reference to FIGS. 4A and 4B.

Figure 4A:
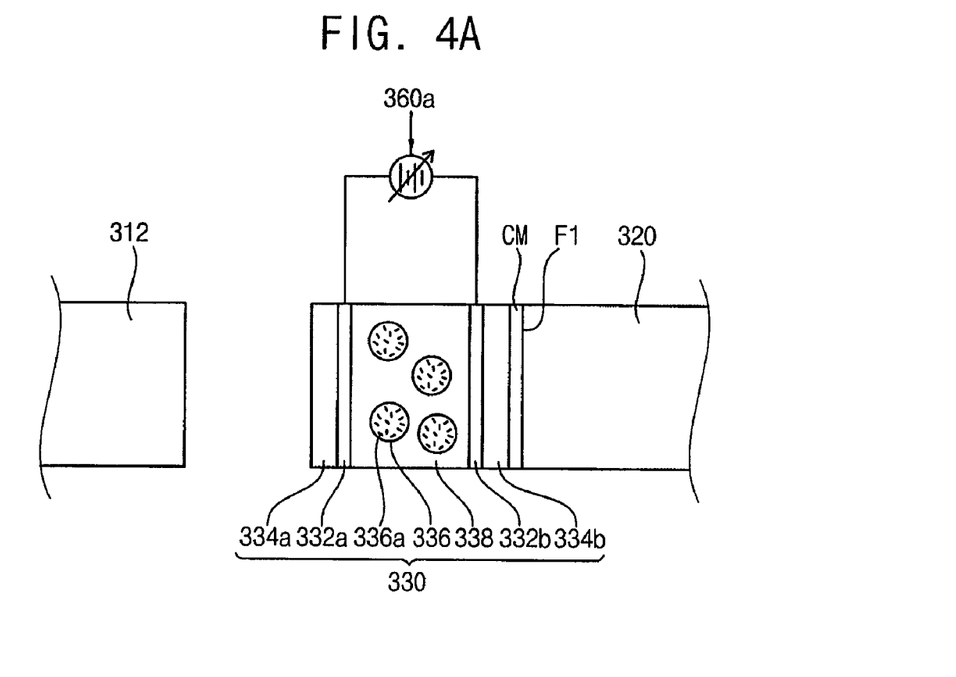
FIGS. 4A and 4B are diagrams illustrating a principle for controlling the transmissivity of the variable transmissivity film according to one or more embodiments.
Figure 4B:
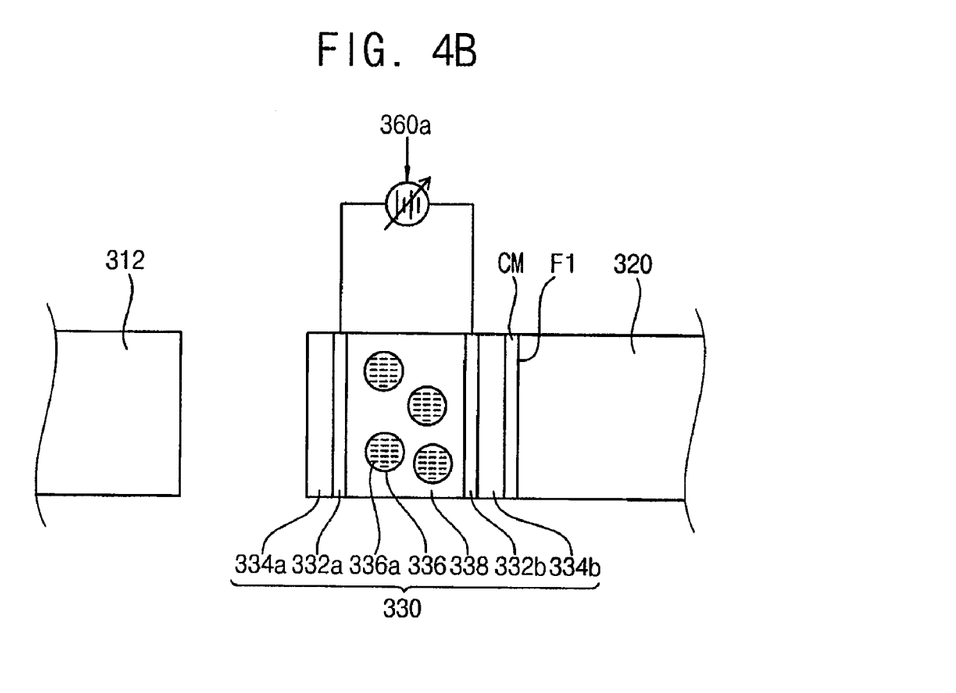

FIGS. 4A and 4B are diagrams illustrating a principle for controlling the transmissivity of the variable transmissivity film according to one or more embodiments.

Referring to FIGS. 4A and 4B, the variable transmissivity film 330 includes a first conductive layer 332a, a second conductive layer 332b and polarized particles 336a. The variable transmissivity film 330 may further include a first transparent film 334a, a second transparent film 334b and a matrix polymer 338. The variable transmissivity film 330 may be attached to the first surface F1 of the light-guide plate 320 by a coupling member CM.

The first conductive layer 332a may be formed at the first transparent film 334a and the second conductive layer 332b may be formed at the second transparent film 334b. The second transparent film 334b may be omitted and the second conductive layer 332b may contact the first surface F1 of the light-guide plate 320 through the coupling member CM.

The first conductive layer 332a and the second conductive layer 332b are disposed facing each other.

The polarized particles 336a are disposed between the first conductive layer 332a and the second conductive layer 332b. The polarized particles 336a may be disposed in an inner part of capsules 336 mixed with the matrix polymer 338. The polarized particles 336a are arranged in substantially the same direction in response to an electric field generated between the first conductive layer 332a and the second conductive layer 332b.

Referring to FIG. 4A, when the electric field is not generated between the first conductive layer 332a and the second conductive layer 332b corresponding to a portion of the variable transmissivity film 330, the polarized particles 336a have Brownian motion in the inner part of capsules 336 and are maintained in a random state. The polarized particles 336a of the random state diffuse and/or absorb the light from the light source 312 using dichroism of the polarized particles 336a, so that the light does not pass through the variable transmissivity film 330. Thus, the variable transmissivity film 330 has an opaque state. At this time, a voltage level of the first dimming signal 360a applied to the variable transmissivity film 330 is defined as a first voltage level and a light transmissivity in the first voltage level is defined as 0%.

Referring to FIG. 4B, when the electric field is generated between the first conductive layer 332a and the second conductive layer 332b corresponding to a portion of the variable transmissivity film 330, the polarized particles 336a are arranged in a predetermined direction in the inner part of the capsules 336. The predetermined direction may be a direction of the electric field generated between the first conductive layer 332a and the second conductive layer 332b. That is, the polarized particles 336a are arranged perpendicular to the first conductive layer 332a and the second conductive layer 332b. The direction of the polarized particles 336a is the same as the incident direction of the light from the light source 312, so that the light passes between the polarized particles 336a. Thus, the variable transmissivity film 330 has a transparent state. At this time, a voltage level of the first dimming signal 360a applied to the variable transmissivity film 330 is defined as a second voltage level and a light transmissivity in the second voltage level is defined as 100%.

The first dimming driving part 360 may output the first dimming signal 360a having a third voltage level between the first voltage level and the second voltage level to the variable transmissivity film 330. When the first dimming signal 360a having the third voltage level is applied to the variable transmissivity film 330, the light transmissivity of the variable transmissivity film 330 may be defined as greater than 0% but less than 100%. That is, the first dimming driving part 360 may output the first dimming signal 360a having various voltage levels so that the light transmissivity of the variable transmissivity film 330 may be controlled. The first dimming signal 360a having the various voltage levels is outputted by the first dimming control signal 100b from the control part 110 based on the image control signal 100a.

Figure 4C:
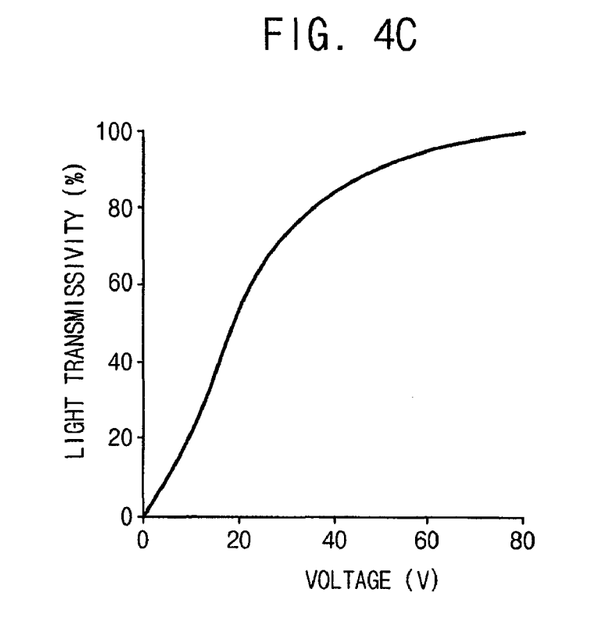
FIG. 4C is a graph illustrating a transmissivity variation according to a voltage level of the variable transmissivity film.

FIG. 4C is a graph illustrating a transmissivity variation according to a voltage level of the variable transmissivity film.

Referring to FIG. 4C, when the first voltage level of the first dimming signal 360a applied to the variable transmissivity film 330 is about 0 V, the light transmissivity of the variable transmissivity film 330 may be about 0%. That is, in the first voltage level, the variable transmissivity film 330 is in an opaque state through which the light cannot pass.

When the second voltage level of the first dimming signal 360a applied to the variable transmissivity film 330 is about 80 V, the light transmissivity of the variable transmissivity film 330 may be about 100%. That is, in th second voltage level, the variable transmissivity film 330 is in the transparent state through which the light can pass.

When the third voltage level of the first dimming signal 360a is about 20 V, 40 V or 60 V, the light transmissivity of the variable transmissivity film 330 may be about 55%, 85% or 95%, respectively. When the light transmissivity of the variable transmissivity film 330 is adjusted to about 70%, a voltage level of about 28 V may be applied to the variable transmissivity film 330.

As the voltage level applied to the variable transmissivity film 330 is controlled, the light transmissivity of the variable transmissivity film 330 may be variously controlled from about 0% to about 100%. The variable transmissivity film 330 has about 100% light transmissivity at about 80 V, but the second voltage level having about 100% light transmissivity may be a variable.

As described in the present embodiment, although the light source 312 is not individually driven, an effect substantially the same as a local dimming may be achieved using the backlight assembly 300 having the variable transmissivity film 330. Particularly, despite an edge illumination type backlight assembly having a linear light source such as in the present embodiment, an effect substantially the same as the local dimming may be achieved. By controlling the first dimming signal 360a applied to the variable transmissivity film 330, a contrast ratio may be improved by realizing various gradation voltages.

In FIGS. 4A and 4B, the variable transmissivity film 330 is described according to one or more embodiments where the polarized particles 336a are arranged in substantially the same direction when the electric field is generated between the first conductive layer 332a and the second conductive layer 332b. However, the variable transmissivity film 330 may also be used where the polarized particles 336a have a random state when the electric field is generated between the first conductive layer 332a and the second conductive layer 332b.

Figure 5:
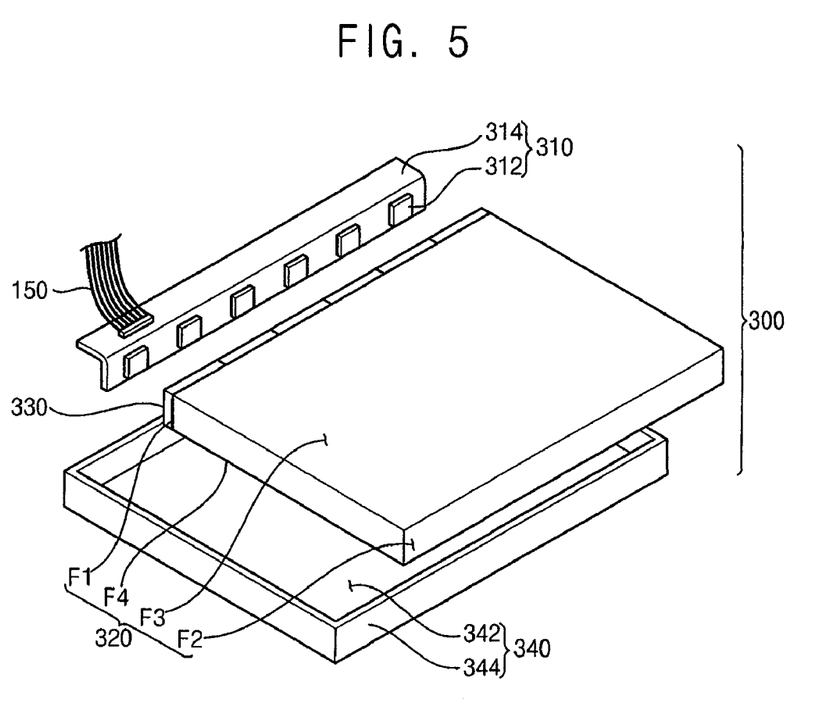
FIG. 5 is a perspective view illustrating a backlight assembly according to another embodiment of the present invention.
Figure 6:
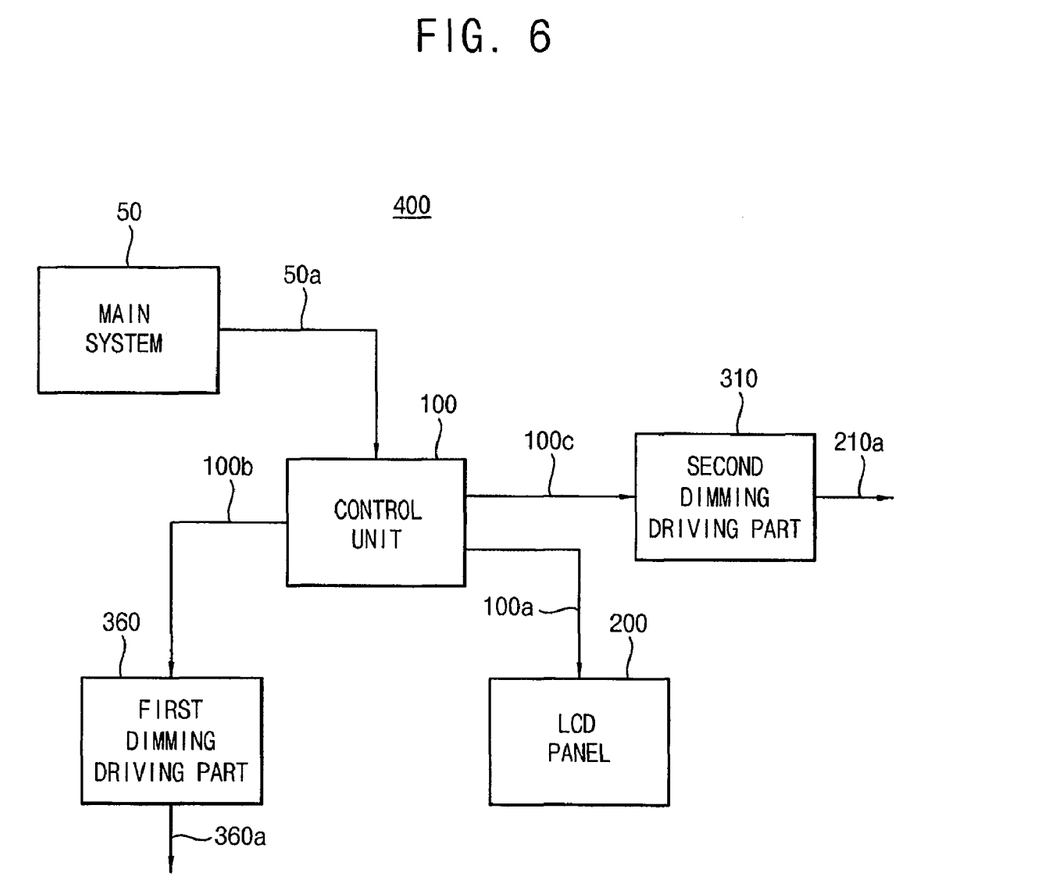
FIG. 6 is a block diagram illustrating the display device in FIG. 5.

FIG. 5 is a perspective view illustrating a backlight assembly according to another embodiment of the present invention. FIG. 6 is a block diagram illustrating the display device in FIG. 5.

In FIGS. 5 and 6, the display device including the backlight assembly is substantially the same as those of FIGS. 1 and 2 except for the type of light source and the second dimming driving part. Thus, substantially the same elements in FIGS. 1 and 2 are referred to using the same reference numerals, and further descriptions of substantially the same elements will be omitted.

Referring to FIGS. 5 and 6, a display device 400 according to the present embodiment includes a control unit 100, a display panel unit 200 and a backlight assembly 300.

The control unit 100 includes a fourth connector 150. The fourth connector 150 electrically connects a control part 110 with a second dimming driving part 310.

The second dimming driving part 310 includes a plurality of light sources 312 and a driving substrate 314.

Each of the light sources 312 according to the present embodiment is a point light source. For example, the light sources 312 may be a light-emitting diode (LED). The light sources 312 are disposed on the driving substrate 314. The light sources 312 may include white LEDs emitting white light. The light sources 312 may include red LEDs emitting red light, green LEDs emitting green light and/or blue LEDs emitting blue light.

The driving substrate 314 may include controlling lines (not shown) controlling the light sources 312 and power supply lines (not shown) providing the power to the light sources 312.

The control unit 100 receives an external control signal 50a from a main system 50 and outputs a second dimming control signal 100c to the second dimming driving part 310. The second dimming control signal 100c is applied to the second dimming driving part 310 and the second dimming driving part 310 outputs a second dimming signal 210a. The second dimming control signal 100c may be provided to the second dimming driving part 310 by synchronizing with the image control signal 100a.

The second dimming driving part 310 generates the second dimming signal 210a using the second dimming control signal 100c and outputs the second dimming signal 210a to the driving substrate 314. The second dimming signal 210a is applied to the plurality of light sources 312 and drives each of the regions of the light sources 312, respectively.

For example, the first dimming signal 360a may control the light transmissivity of the variable transmissivity film 330 by generating the electric field in the first region L1. The light source 312 corresponding to the first region L1 may be driven by the second dimming signal 210a.

As the light sources 312 may be maintained in an "on" state instead of driving each region, and the variable transmissivity film 330 may control the light transmissivity of each region using the first dimming driving part 360, an effect substantially the same as the local dimming may be achieved.

Figure 7:
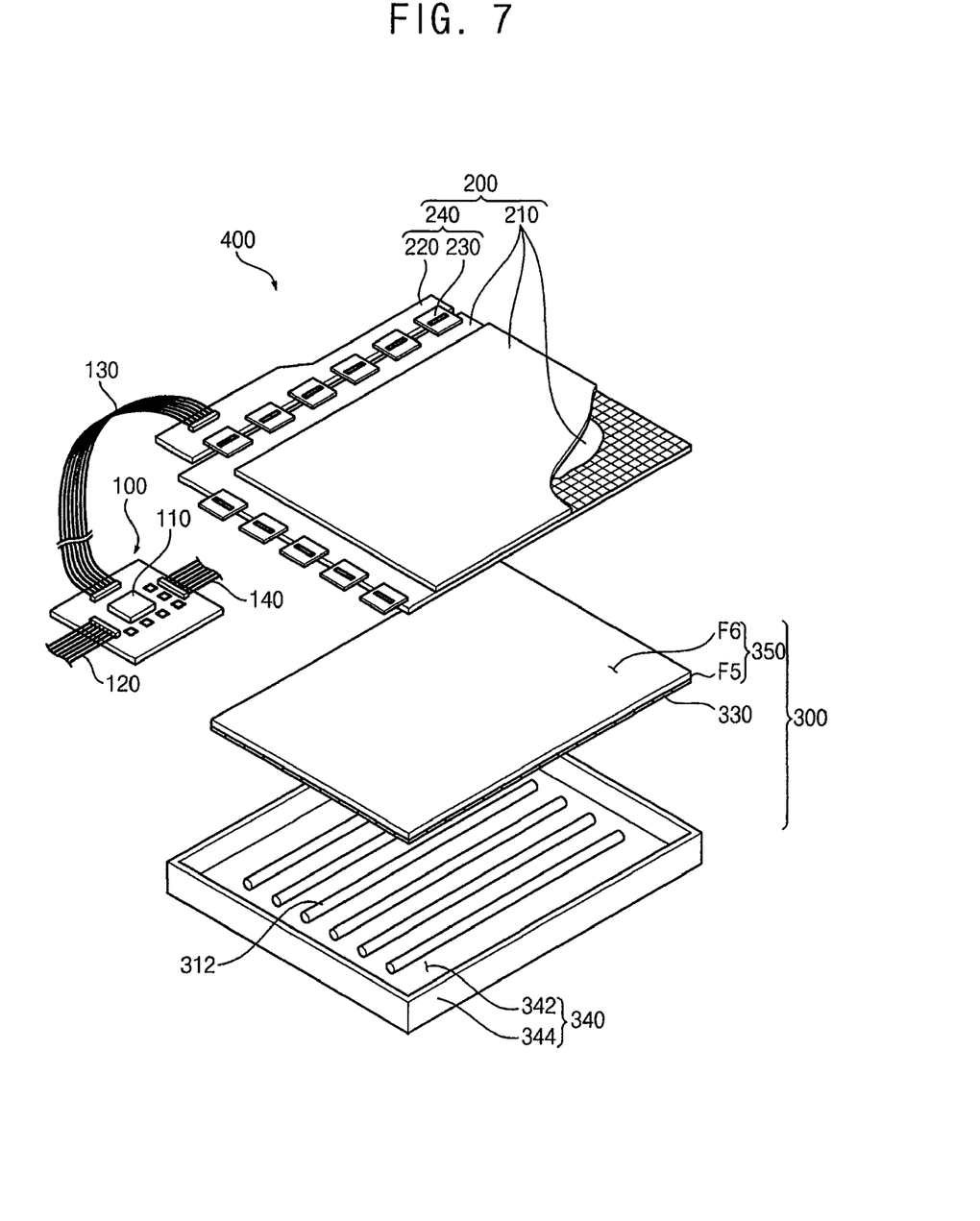
FIG. 7 is a perspective view illustrating a display device according to still another embodiment of the present invention.

FIG. 7 is a perspective view illustrating a display device according to still another embodiment of the present invention.

In FIG. 7, the display device is substantially the same as those of FIGS. 1 and 2, except for a plurality of light sources and a light diffusing plate. Thus, substantially the same elements as in FIGS. 1 and 2 are referred to using the same reference numerals, and further descriptions of substantially the same elements will be omitted.

Referring to FIG. 7, a display device 400 according to the present embodiment includes a backlight assembly 300 having light sources 312, a light diffusing plate 350 and a variable transmissivity film 330. The backlight assembly 300 according to the present embodiment includes a first dimming driving part (not shown, referring to FIG. 2, 360).

The backlight assembly 300 is a direct illumination type backlight assembly in which the light sources 312 are disposed under the light diffusing plate 350. The backlight assembly 300 may further include optical sheets (not shown) that are disposed between the display panel 210 and the light diffusing plate 350 to enhance optical characteristics. For example, the optical sheets may include at least one prism sheet increasing a front luminance of the light.

The light sources 312 according to the present embodiment are linear light sources. For example, the light sources 312 may be a cold cathode fluorescent lamp (CCFL), a hot cathode fluorescent lamp (HCFL), etc. The light sources 312 may be disposed on a bottom portion 342 of a receiving member 340 and may be parallel with each other. Both ends of the light sources 312 include electrodes (not shown, referring to FIG. 1, 312) that provide power to the light sources 312. The light sources 312 may be provided with power by a power supply part electrically connected to the electrodes.

The light sources 312 may be driven at each region by the second dimming driving part (referring to FIG. 6, 310), which is electrically connected to the control unit 100.

The light diffusing plate 350 may be disposed over the light sources 312 and may diffuse light generated from the light sources 312 to be emitted from a front surface of the display panel 210. The light diffusing plate 350 includes a fifth surface F5 facing the light sources 312 and a sixth surface F6 facing the fifth surface F5. The fifth surface F5 is an incident part of the light diffusing plate 350 and the sixth surface F6 is an emitting part of the light diffusing plate 350. The fifth surface F5 and the sixth surface F6 may be parallel with each other. The fifth surface F5 and the sixth surface F6 are disposed parallel with the bottom portion 342 of a receiving member 340 and the light sources 312. The light diffusing plate 350 may diffuse and emit the incident light on the fifth surface F5 through the sixth surface F6.

The variable transmissivity film 330 is disposed between the light sources 312 and the fifth surface F5 of the light diffusing plate 350. For example, the variable transmissivity film 330 may be attached to the fifth surface F5 of the light diffusing plate 350. The variable transmissivity film 330 may cover the entire fifth surface F5 of the light diffusing plate 350. However, a plurality of variable transmissivity films 330 may be attached to the fifth surface F5.

Figure 8:
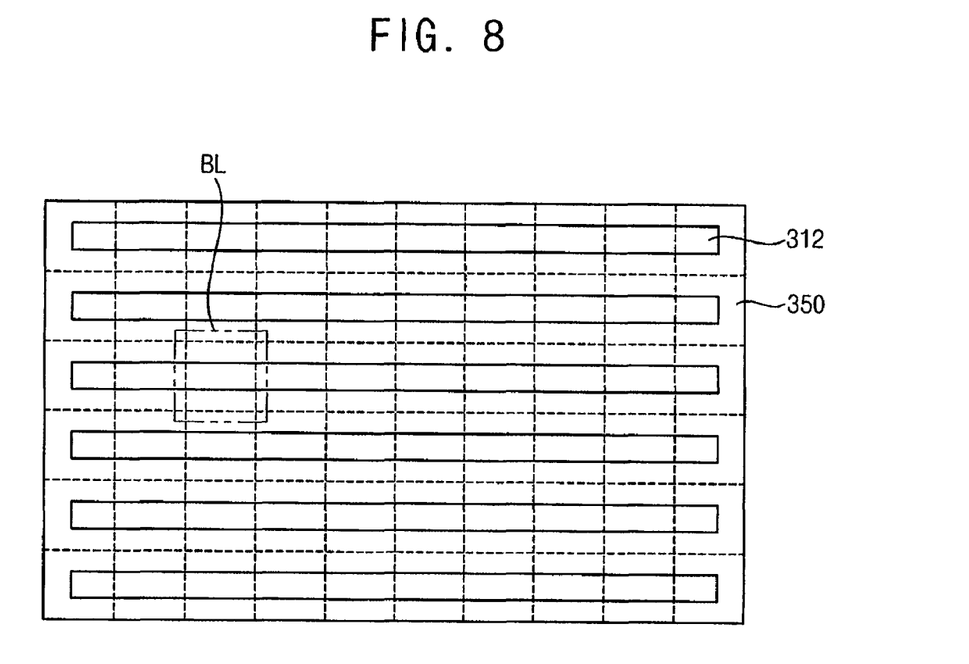
FIG. 8 is a conceptual view illustrating regions of the backlight assembly illustrated in FIG. 7 according to an embodiment.

FIG. 8 is a conceptual view illustrating regions of the backlight assembly illustrated in FIG. 7 according to an embodiment.

Referring to FIG. 8, the variable transmissivity film 330 according to the present embodiment includes a plurality of regions. For example, the unit regions BL may be a matrix shape. However, the unit regions BL may be a stripe shape.

The first dimming signals 360a that are different from each other and are outputted from the first dimming driving part 360 using the first dimming control signals 100b that are different from each other based on the external control signals 50a that are different from each other, are applied to the regions BL of the variable transmissivity film 330. Thus, the light transmissivity of each unit regions BL of the variable transmissivity film 330 is different. The sixth surface F6 of the light diffusing plate 350 also includes a plurality of regions that has different light transmissivities and a matrix shape.

By controlling the light transmissivity of each unit region BL by applying the first dimming signals that are different from each other to the regions BL of the variable transmissivity film 330, an effect may be achieved substantially the same as driving the backlight assembly 300 by dividing it into a plurality of regions corresponding to the unit regions BL.

The light sources 312 may be individually driven by the second dimming driving part 310 (shown on FIG. 6). The second dimming control signal 100c provided to the second dimming driving part 310 is substantially the same as the first dimming control signal 100b provided to the first dimming driving part 360. Thus, the variable transmissivity film 330 is individually driven and the light sources 312 may be individually driven by each of the electrically divided regions at the same time.

Figure 9:
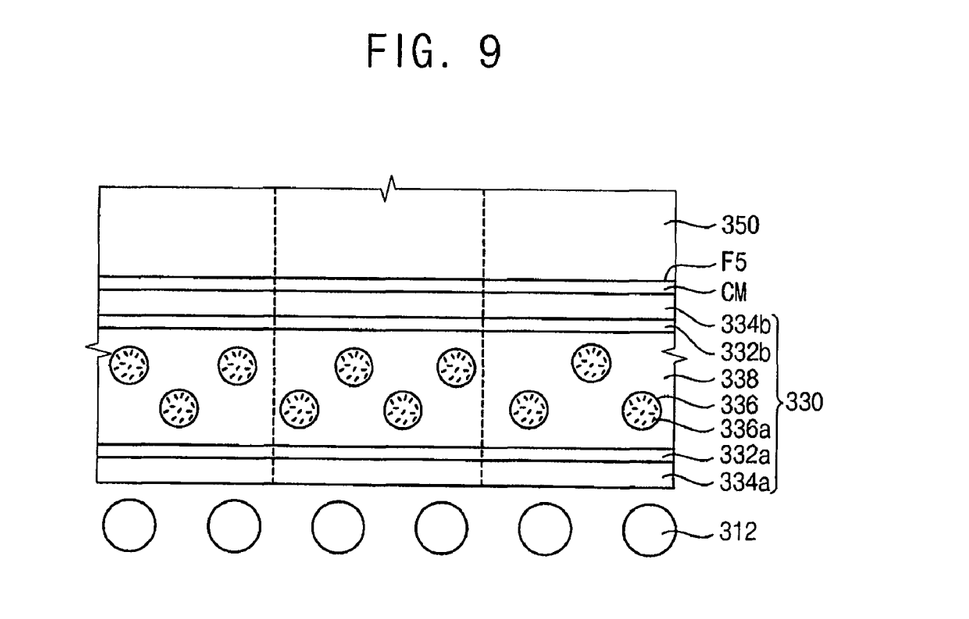
FIG. 9 is a cross-sectional view illustrating the backlight assembly illustrated in FIG. 7 according to an embodiment.

FIG. 9 is a cross-sectional view illustrating the backlight assembly illustrated in FIG. 7 according to an embodiment.

In FIG. 9, an electric field is not generated in the variable transmissivity film. Referring to FIG. 9, the variable transmissivity film 330 includes a first conductive layer 332a, a second conductive layer 332b and polarized particles 336a. The variable transmissivity film 330 may further include a first transparent film 334a, a second transparent film 334b and a matrix polymer 338. The variable transmissivity film 330 may be attached to the fifth surface F5 of the light diffusing plate 350 by a coupling member CM.

The polarized particles 336a may be maintained in a random state when the electric field is not generated between the first conductive layer 332a and the second conductive layer 332b, and the polarized particles 336a may be arranged in substantially the same direction of the electric field when the electric field is generated between the first conductive layer 332a and the second conductive layer 332b. By controlling a voltage level applied to the first conductive layer 332a and the second conductive layer 332b, the direction of the polarized particles 336a is controlled so that the light transmissivity of the variable transmissivity film 330 may be controlled.

Figure 10:
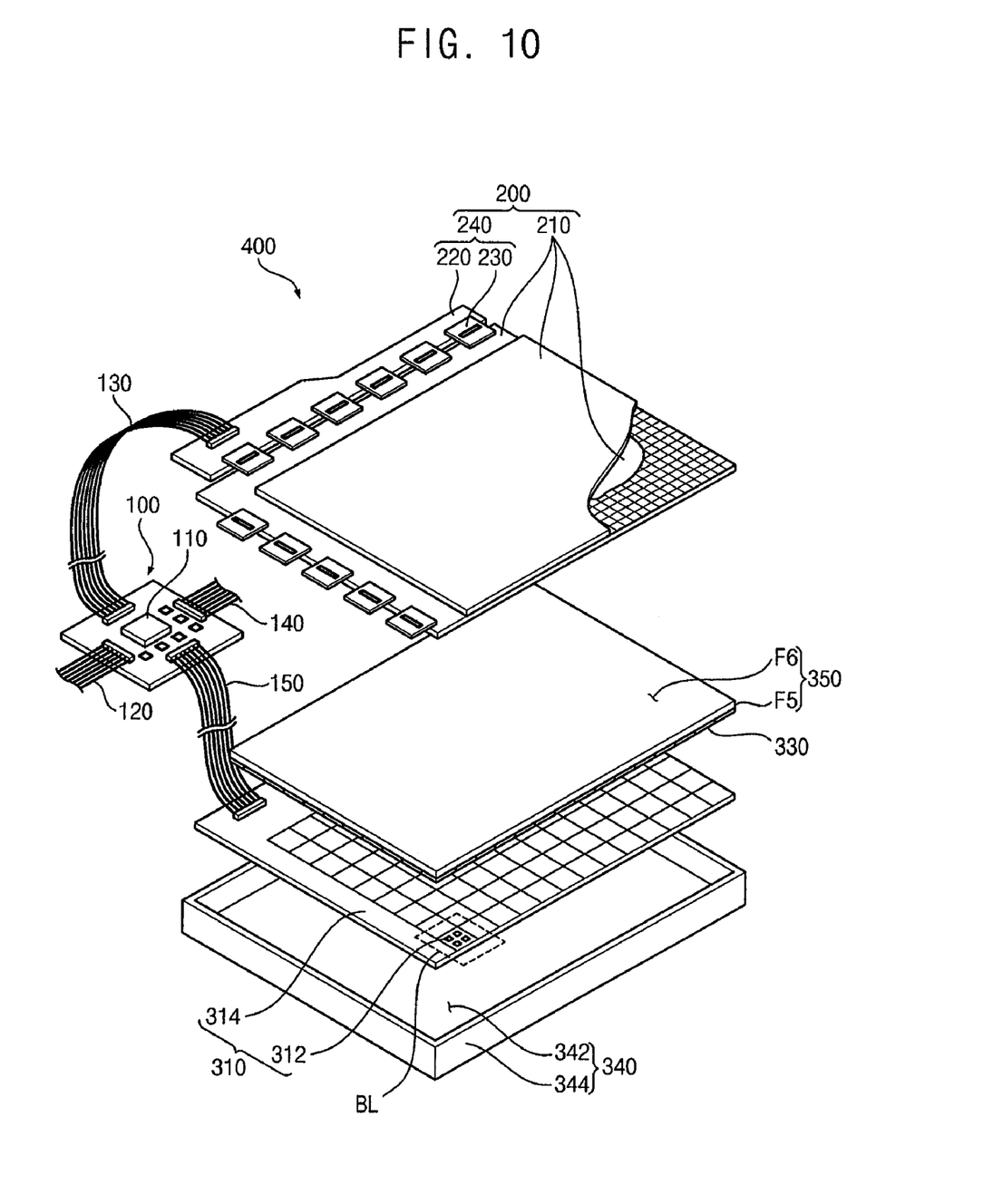
FIG. 10 is a perspective view illustrating a display device according to still another embodiment of the present invention.
Figure 11:
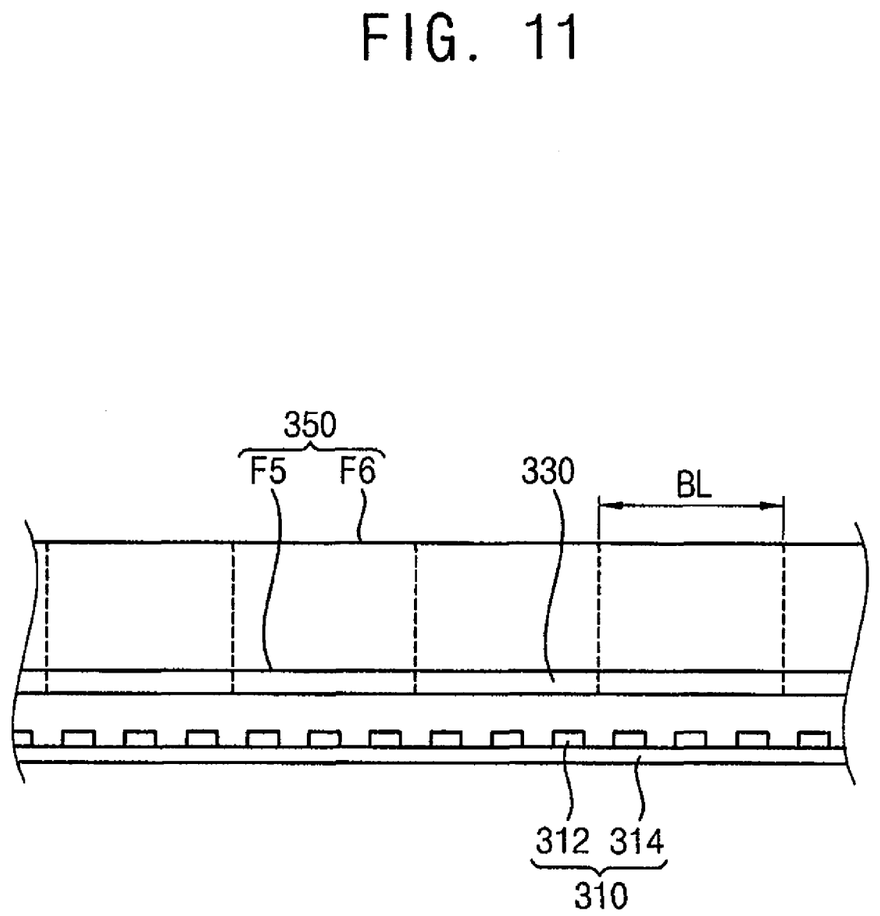
FIG. 11 is a cross-sectional view illustrating the backlight assembly illustrated in FIG. 10 according to an embodiment.

FIG. 10 is a perspective view illustrating a display device according to still another embodiment of the present invention. FIG. 11 is a cross-sectional view illustrating the backlight assembly illustrated in FIG. 10.

In FIGS. 10 and 11, the display device is substantially the same as those of FIG. 7 except for a second dimming driving part including point light sources. Thus substantially the same elements as in FIG. 7 are referred to using the same reference numerals, and further descriptions of substantially the same elements will be omitted.

Referring to FIGS. 10 and 11, a display device 400 according to the present embodiment includes a backlight assembly 300 and a second dimming driving part 310. The backlight assembly 300 includes light sources 312, a light diffusing plate 350, a variable transmissivity film 330 and a first dimming driving part 360. The backlight assembly 300 is a direct illumination type backlight assembly in which the light sources 312 are disposed under the light diffusing plate 350.

Each of the light sources 312 according to the present embodiment is a point light source. For example, the light sources 312 may be an LED. The light sources 312 may be disposed on a bottom portion 342 of a receiving member 340 and may provide light to a front surface of a fifth surface F5 of the light diffusing plate 350. The driving substrate 314 may include controlling lines (not shown) controlling the light sources 312 and power supply lines (not shown) providing power to the light sources 312.

The variable transmissivity film 330 is attached to the fifth surface F5 of the light diffusing plate 350. The second dimming driving part 310 is disposed facing the variable transmissivity film 330. The second dimming driving part 310 may be disposed such that the plurality of the light sources 312 on the driving substrate 314 corresponds to the front surface of the fifth surface F5 of the light diffusing plate 350.

The second dimming driving part 310 is electrically connected to the control unit 100. The second dimming driving part 310 may be electrically connected to the control unit 100 through a fourth connector 150. The second dimming driving part 310 may individually drive the light sources 312 by each of the regions.

For example, the unit region BL of the variable transmissivity film 330 may correspond to four light sources 312. The number of light sources 312 corresponding to the unit region BL of the variable transmissivity film 330 may be optionally selected. A first dimming control signal 100b may be applied to the first dimming driving part 360 by synchronizing with the image control signal 100a applied to the display panel 210. A second dimming control signal 100c may be applied to the second dimming driving part 310 by synchronizing with the first dimming signal 360a. By controlling a voltage level of the first dimming signal 360a applied to the unit regions BL of the variable transmissivity film 330, the light transmissivity of each of the unit regions BL may be controlled.

The backlight assembly 300 may be individually driven by variation of the light transmissivity of each of the unit regions BL, and by individually driving the light sources 312.

Therefore, a backlight assembly may be individually driven using a variable transmissivity film regardless of the type of light source and the disposition of the light sources. The light sources may be individually driven at the same time as when the light transmissivity of each unit region is varied. By varying a gradation voltage by individually driving the light sources of the backlight assembly, a contrast ratio may be improved. Thus, embodiments of the present invention may improve image display quality.

Although exemplary embodiments of the present invention have been described, it is understood that the present invention should not be limited to these exemplary embodiments but various changes and modifications can be made by one ordinary skilled in the art within the spirit and scope of the embodiments of the present invention as hereinafter claimed.

What is claimed is:
1. An optical member comprising:
an optical plate including an incident part receiving light provided from an external light source and an emitting part emitting the light; and
an optical film attached to the incident part and including a first conductive layer, a second conductive layer facing the first conductive layer and polarized particles disposed between the first conductive layer and the second conductive layer,
wherein the optical film is disposed between the optical plate and the external light source,
wherein the optical film includes a plurality of regions receiving different voltages and having different transmissivities.

2. The optical member of claim 1, wherein the polarized particles are arranged in substantially the same direction in response to an electric field generated between the first conductive layer and the second conductive layer.

3. The optical member of claim 1, wherein the optical film further comprises:
a first transparent film disposed between the incident part and the first conductive layer;
a second transparent film facing the first transparent film and being coupled with the second conductive layer; and
a matrix polymer disposed between the first conductive layer and the second conductive layer.

4. A backlight assembly comprising:
a light source generating light;
an optical plate including an incident part receiving the light and an emitting part emitting the light;
an optical film attached to the incident part and including a first conductive layer, a second conductive layer facing the first conductive layer and polarized particles disposed between the first conductive layer and the second conductive layer; and
a dimming driving part applying a dimming signal to the first conductive layer and the second conductive layer,
wherein the optical film is disposed between the optical plate and the light source,
wherein the optical film includes a plurality of regions receiving different voltages and having different transmissivities.

5. The backlight assembly of claim 4, wherein the light source is disposed at a side portion of the optical plate.

6. The backlight assembly of claim 5, wherein the optical film is attached to a side surface of the optical plate, and divides the emitting part of the optical plate into stripe regions that have different transmissivities according to the dimming signal.

7. The backlight assembly of claim 6, wherein the light source includes a lamp or a light-emitting diode (LED).

8. The backlight assembly of claim 4, wherein the light source is disposed under the optical plate.

9. The backlight assembly of claim 8, wherein the optical film is attached to a lower surface of the optical plate, and divides the emitting part of the optical plate into matrix regions that have different transmissivities according to the dimming signal.

10. The backlight assembly of claim 9, wherein the light source includes a lamp or an LED.

11. The backlight assembly of claim 4, wherein the optical film further comprises:
a first transparent film disposed between the incident part and the first conductive layer;
a second transparent film facing the first transparent film and being coupled with the second conductive layer; and
a matrix polymer disposed between the first conductive layer and the second conductive layer.

12. A display device comprising:
a display panel displaying an image;
a control unit controlling a driving of the display panel;
a light source generating light to provide the display panel with the light;
an optical plate including an incident part receiving the light and an emitting part emitting the light to the display panel;
an optical film attached to the incident part and including a first conductive layer, a second conductive layer facing the first conductive layer and polarized particles disposed between the first conductive layer and the second conductive layer, the optical film being electrically divided into a plurality of regions; and
a first dimming driving part applying a first dimming signal to the first conductive layer and the second conductive layer,
wherein the optical film is disposed between the optical plate and the light source.

13. The display device of claim 12, wherein the first dimming driving part outputs the first dimming signal according to the control of the control unit.

14. The display device of claim 13, wherein each of the regions of the optical film has a variable transmissivity according to a voltage level of the first dimming signal.

15. The display device of claim 12, wherein the light source includes a plurality of LEDs, and the LEDs are grouped into a plurality of groups divided into a plurality of regions.

16. The display device of claim 15, further comprising a second dimming driving part outputting a second dimming signal that is synchronized with the first dimming signal and controls driving of each of the regions.

17. The display device of claim 12, wherein the optical film further comprises:
a first transparent film disposed between the incident part and the first conductive layer;
a second transparent film facing the first transparent film and being coupled with the second conductive layer; and
a matrix polymer disposed between the first conductive layer and the second conductive layer.

* * * * *